Figure 1:
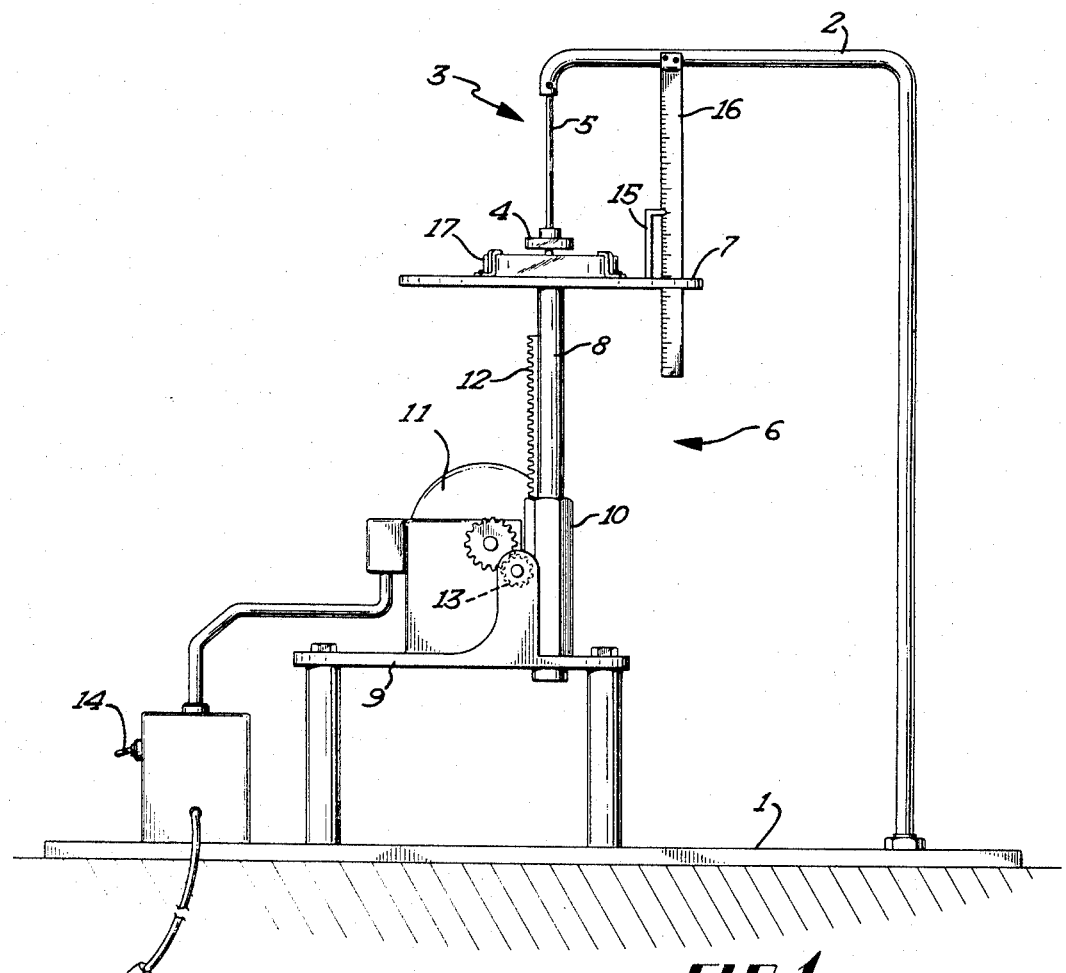

March 25, 1969

M. H. KATZ 3,434,848

EDIBLE DRY MIX COMPOSITION FOR PRODUCING
AN AERATED FOOD PRODUCT

Filed Aug. 24, 1966

INVENTOR.
MORRIS H. KATZ

BY

ATTORNEY

United States Patent Office 3,434,848
Patented Mar. 25, 1969

3,434,848
EDIBLE DRY MIX COMPOSITION FOR PRODUC-
ING AN AERATED FOOD PRODUCT
Morris H. Katz, Minneapolis, Minn., assignor to The
Pillsbury Company, Minneapolis, Minn., a corporation
of Delaware
Filed Aug. 24, 1966, Ser. No. 574,600
Int. Cl. A23l 1/14; A23g 5/00
U.S. Cl. 99—139                                23 Claims This invention relates to food compositions adaptable for human consumption. More particularly, this invention relates to edible premixes containing gelatinized starch.

Heretofore, powdered, hyratable dessert mixes adaptable for use in whipped products such as fillings, custards, ice cream, sherbert, puddings, toppings and the like, employing powdered fat and/or proteinaceous materials have been prepared. U.S. Patent 3,098,748 by P. P. Noznick et al. discloses a powdered shortening containing from 1 to 10 percent propylene glycol monostearate. In order to enhance the whipping effect thereof, it is necessary to employ proteinaceous materials in amounts ranging from 1 to 15 percent by weight of the total dry mix. Also, it is necessary to employ various gums such as carageenin, sodium alginate, gum tragacanth, gum acacia, gum karaya, locust bean and the like to provide the necessary stability and stiffness.

Similarly, U.S. Patent 2,913,342 by Cameron et al. discloses a dehydrated mix which upon rehydration and whipping provides an aerated product. In Cameron, et al, the employment of fat and proteinaceous material is deemed essential to provide an aerated product.

It is an object of the present invention to provide a dry dessert mix which upon rehydration combines the properties of superior mouthfeel, body, texture and appearance.

A further object is to provide a dry gelatinized starch premix which will provide an aerated food product when reconstituted and whipped with an aqueous liquid.

An additional object of the invention is to provide a starch-based, buffer, salt-free, dry mix capable of being hydrated with an aqueous liquid to a "short" custard gel character without concomitant pasty, stringy or gummy gel character.

A further object of the invention is to provide an aerated food product of a smooth, creamy consistency which does not necessitate the presence of proteinaceous materials or fat.

FIGURE I depicts an apparatus suitable for measuring short gel characteristics.

FIGURE II is an enlarged, fragmentary elevational view of the apparatus depicted in FIGURE I engaged in measuring the short gel characteristics of a reconstituted mix.

According to the present invention there is provided an edible dry mix composition containing less than 8 percent by weight triglyceride fat and proteinaceous material and which upon hydration and mixing provides an aerated food product of a fine, smooth, creamy consistency having a short gel reading of less than 35, said mix composition comprisng a gelatinized starch and a surfactant composition, said surfactant composition being present in the mix composition in an amount ranging from at least 2.0 to about 50 weight percent of the gelatinized starch dry weight, said surfactant composition comprising at least one glyceryl monoester of a fatty acid and at least one propylene glycol monoester of a fatty acid, said mix containing a weight ratio of glyceryl monoester to propylene glycol monoester ranging from about 1:10 to about 10:1.

The mix compositions provided herein, upon hydration and aeration with an aqueous liquid such as water or milk, provide a resultant product of a fine, smooth and creamy consistency. Unlike the previous hydrated and aerated dry mixes, the instant dry mix compositions rely principally upon the gelatnized starch and surfactant compostion to provide the ultimate whipped product. The dry mix compositions thus provide a whipped dessert product without necessitating the employment of fats, oils and proteinaceous materials heretofore deemed essential.

Gelatinized starches adaptable herein are the precooked starches wherein the starch granules have been gelatinized. Such gelatinized starches absorb water and form a paste or gel upon the addition of cold water (20° C.) whereas ungelatinized or raw starches are insoluble in a cold aqueous system and merely disperse therein to form slurries. Suitable edible gelatinized starches that may be employed include corn, high amylose corn, wheat, oat, potato, waxy maize, tapioca, sorghum, sago, rice, arrowroot starches, mixtures thereof and the like. Typical gelatinized starches are raw starches which have been modified via oxidation, acid hydrolysis or esterification and then cooked. Exceptional results being achieved with a gelatinized tapioca starch. A gelatinized starch having a particle size finer than #80 U.S. Standard mesh is generally employed since starches of such a particle size disperse more rapidly in an aqueous medium.

The amount of gelatinized starch contained in the mix will depend largely upon the ultimate type of dessert product desired. Highly aerated dessert products generally require a higher weight percent of gelatinized starch than dessert products of a greater density. In general, the amount of gelatinized starch is greater than at least 5 weight percent of the total mix ingredients. Illustrative amounts of gelatinized starch contained in the mix ranges from about 8 to about 98 weight percent of the total weight thereof, Preferably included are those mixes which contain from about 10 to about 40 weight percent gelatinized starch (based upon total mix weight).

Modification of the gelatinized starch to provide a uniform textured dessert product of short gel character is provided by the surfactant composition. In the mix, it is not essential to uniformly admix the gelatinized starch and surfactant composition. However, it is essential to provide a mix containing the surfactant composition in a form capable of being dispersed in an aqueous medium. Thus, the surfactant composition can be included along with the gelatinized starch as a single-stage mix recipe or separately packaged to provide a two-stage recipe mix.

Highly aerated dessert products of low solids content (e.g, whipped toppings) in comparison to high-solid, slightly aerated dessert products such as those of a custard consistency differ in regard to the best manner by which the gelatinized starch modification is achieved.

In the highly aerated products the ratio of water to solids provided in the reconstituted product is relatively high. Consequently, less time is necessary to hydrate the gelatinized starch. Accordingly, the time necessary to modify and maintain the short gel character thereof is greatly reduced. Thus, in highly aerated dessert product, it is desirable to include the surfactant composition in a readily hydratable form. Mixes containing a fast hydrating surfactant composition may be prepared by providing an admixture of the gelatinized starch in combination with a finely divided form of the surfactant composition. Another method of achieving a rapidly hydrating surfactant composition is to cospray the melted surfactant composition which has been dispersed in a solution of a readily water-soluble, hydrophilic film former. In such spray-dried products, the surfactant composition is uniformly distributed throughout a matrix of the film former. Upon dispersion of the spray-dried product in an aqueous medium, the film former rapidly dissolves therein permitting uniform surfactant distribution throughout the aqueous medium. Uniform surfactant distribution provides uniform gelatinized starch modification.

With high-solid, slightly aerated dessert products, the limiting factor is the hydration rate of the gelatinized starch. Hydration thereof can be expedited by employing warm or hot aqueous mediums. A readily hydratable surfactant composition, however, will facilitate the hydration rate and modification of the gelatinized starch.

Surfactant compositions adaptable to the instant mixes comprise at least 1 glyceryl fatty acid monoester and at least 1 propylene glycol fatty acid monoester. Satisfactory amounts of total surfactant composition contained in the mix ranges from at least 2.0 to about 50 weight percent of the dry gelatinized starch weight. Illustrative amounts of surfactant composition based upon the total gelatinized starch dry weight range from about 3.0 to about 25.0 weight percent. Superior results are achieved when the amount of surfactant composition ranges from about 5.0 to about 15.0 weight percent. In general, at least a major portion of the surfactant composition consists of the propylene glycol fatty acid monoester and glyceryl fatty acid monoester. Preferably, the surfactant composition consists essentially of the propylene glycol and glyceryl fatty acid monoesters.

Employable glyceryl fatty acid monoesters include the saturated and unsaturated fatty acid monoesters which contain monoester groups from 12 to 22 carbon atoms inclusive. Illustrative glyceryl fatty acid monoesters are glyceryl monooleate, glyceryl monolinoleate, glyceryl monolinolenate, glyceryl monoeleostearate, glyceryl monoricinoleate, glyceryl monopalmitoleate, glyceryl monostearate, glyceryl monopalmitate, glyceryl monolaurate, glyceryl monomyristate, glyceryl monoarachidate, glyceryl monobehenate, mixtures thereof and the like. Advantageously adapted herein are those glyceryl fatty acid monoesters which contain fatty acid monoester groups from 16 to 18 carbon atoms inclusive with superior results being achieved from the saturated fatty acid monoesters thereof (e.g., glyceryl monostearate).

The propylene glycol fatty acid monoesters adaptable to the mixes are the propylene glycol monoesters having fatty acid groups containing from 12 to 22 carbon atoms including the saturated and unsaturated fatty acid monoesters and mixtures thereof. Typical propylene glycol saturated fatty acid monoesters include propylene glycol monostearate, propylene glycol monolaurate, propylene glycol monoarachidate, propylene glycol monomyristate, propylene glycol monopalmitate, propylene glycol monobehenate, mixtures thereof and the like. Illustrative propylene glycol unsaturated fatty acid monoesters include propylene glycol monooleate, propylene glycol monolinoleate, propylene glycol monoeleostearate, propylene glycol monoricinoleate, propylene glycol monopalmitoleate and the like. Advantageously employable herein are the saturated fatty acid monoesters of propylene glycol with distinct advantages being obtained from the propylene glycol monoesters of saturated fatty acids wherein the fatty acid group contains from 16 to 18 carbon atoms. Exceptional results are achieved by employing propylene glycol monostearate with glyceryl monostearate.

The weight ratio of glyceryl fatty acid monoester to propylene glycol fatty acid monoester ranges from about 1:10 to about 10:1. Advantageously, the weight ratio of glyceryl fatty acid monoester to propylene glycol fatty acid monoester ranges from about 7:3 to about 3:7. Exceptional results in respect to short gel character and foam stability are achieved when the weight ratio of glyceryl fatty acid monoester to propylene glycol fatty acid monoester is about 1:1.

The gelatinized starch can be admixed with the total surfactant composition to provide a single package mix recipe. Such admixtures may be provided by conventional means such as ribbon blenders, vertical mixers, high impact mills and the like. Similarly, a portion or all of the surfactant composition may be included along with or without other dessert mix ingredients in a separate package.

For cold-water mixes, the surfactant composition is preferably employed in combination with a water-soluble, hydrophilic film former to provide a surfactant composition exhibiting a solubility of at least 1 gram in 20 ml. of water at 20° C. Such a combination can be provided by cospray drying an aqueous medium containing the film former and surfactant composition singly or in combination with the other dessert mix ingredients.

Illustrative hydrophilic film formers are agar, gelatin, egg albumen, sodium caseinate, nonfat dry milk solids, whole egg, gum arabic, guar gum, arbinogalactan, locust bean gum, carrageenin, gum tragacanth, sodium alginate, carboxymethylcellulose, dextrin, gelatinized starch, whey, bran protein, sodium proteinate of soybean, polyvinylpyrrolidone, lower alkylcellulose ethers (e.g., methyl and ethyl celluloses) mixtures thereof and the like.

In addition to hydrophilic film formers, a sugar in combination therewith such as sucrose, lactose, dextrose, mannose, galactose, maltose, fructose, raffinose, mixtures thereof and the like may be employed. Sugars facilitate the dispersion of hydrophilic film formers when the product is used by the ultimate consumer. Cold water-soluble surfactant composition particulates are advantageously provided by the employment of hydrophilic film formers singly or in combination with sugars which exhibit a solubility of at least 1 gram per 10 ml. of water at 20° C. and preferably a solubility of at least 1 gram per 5 ml. of water at 20° C.

In addition to the surfactant composition, gelatinized starches, hydrophilic film formers, sweetening agents such as the sugars hereinbefore mentioned, artificial sweeteners like calcium, potassium, magnesium or sodium cyclamates, cyclamic acid, sorbitol, saccharin, sodium, calcium or ammonium saccharin, glycerine, mixtures thereof and the like may be added to the instant mixes.

Various other conventional ingredients in quantities and proportions commonly added to dry dessert mixes such as fats and oils, color and flavor additives, foam stabilizers, preservatives, edible acidulents, buffer salts, additional edible surface active agents and the like may be included, depending upon the ultimate desired product.

Exemplary additional edible surface active agents that may be included are the fatty acid diglycerides such as glyceryl distearate; modified fatty acid monoglycerides (e.g., lactylated, acetylated and tartrated monoglycerides); polyoxyethylene derivatives of partial esters of fatty acids and hexitol anhydrides like polyoxyethylene (20) sorbitan monostearate and polyoxyethylene (15) sorbitan dioleate; partial esters of fatty acid esters and hexitol anhydrides such as sorbitan mono- and distearates, sorbitan mono- and dipalmitates, mixtures thereof and the like.

An illustrative mix comprises the following ingredients and amounts thereof:

| Ingredients: | Approximate parts by weight |
| --- | --- |
| Starch (gelatinized) | 40 |
| Glyceryl fatty acid monoester and propylene glycol fatty monoester | 3–20 |
| Sweetening agents (sugars generally 20–150) | 0–500 |
| Water-soluble hydrophilic film formers | 0–100 |

Aerated products prepared by reconstitution and aeration of the mixes herein disclosed do not necessitate the presence of proteinaceous materials or triglyceride fats to provide the foamed product thereof. Most generally, the amount of proteinaceous material and triglyceride fat contained in the dry mix will be less than 8 weight percent of the total dry mix weight. Exceptional results are achieved when the amount of fat or proteinaceous material is less than about 5 weight percent of said total dry mix weight.

The dry mixes provided according to the invention are suitable for a wide range of aerated food products such as toppings, fillings, spreads, frozen desserts or sherbets, fruit freezes and the like. The amount of an aqueous liquid employed to rehydrate the various mixes depends primarily upon the desired ultimate product. Accordingly, the amount of water may vary considerably. Thus, the ultimate product mix may contain from about 30–90 percent by weight water.

The edible dry mix composition of the present invention upon hydration and aeration provide a food product of a fine, smooth, creamy consistency (i.e., short gel characteristics). The short gel characteristics disclosed herein and in the examples are objectively measured by a specially designed apparatus which provides a "short gel reading." FIGURE 1 depicts an apparatus suitable for providing a "short gel reading." The apparatus depicted in FIGURE I comprises a base member 1 to which a rigid vertical support member 2 is connected. Rigidly affixed to the upper end of support member 2 is a testing head 3 which consists of a circular plastic disc 4 attached to support rod 5. The lower plane surface of disc 4 is preferably roughened by any suitable means, such as, for example, by means of a crocus cloth.

A vertically movable testing platform indicated generally at 6 consisting of a circular platform 7 carried by vertical rod 8 which is in turn supported by lower platform 9 attached to base member 1. Vertical rod 8 is mounted within sleeve 10 and is adapted to be moved upwardly and downwardly by vertical constant speed, reversible electric motor 11 operating through rack and pinion 12 and 13. Motor 11 is shown connected to a power supply through switch 14.

Circular platfrom 7 is provided with a rigidly affixed scale indicator 15 which cooperates with calibrated scale 16 (in mm.) attached to vertical support member 2.

Figure 2:
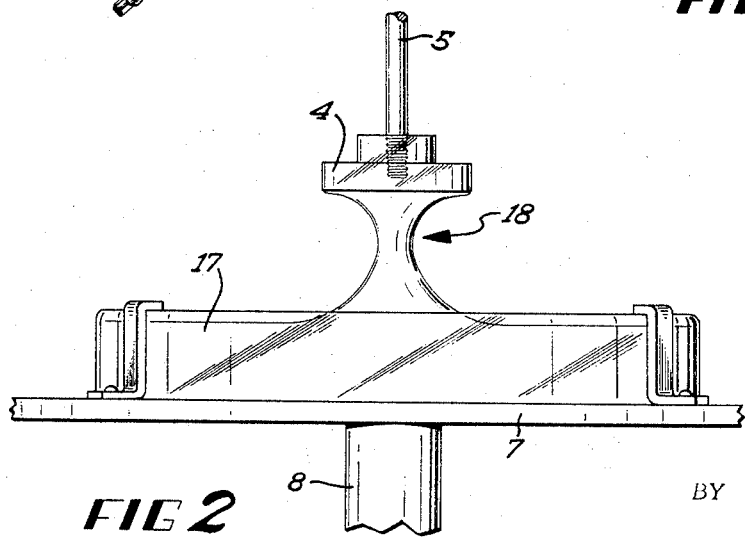

In operation a sample material is placed within any suitable container, such as a petri dish 17, and located upon circular platform 7 in a position substantially co-axial with disc 4. Platform 7 is raised until plane surface 6 of disc 4 is in complete contact (i.e., flush with the disc's 7 plane surface) with the sample in petri dish 17. At that point an initial reading is taken on scale 16. Motor 11 is then engaged to lower platform 7 at a constant speed. As shown in FIGURE 2 a cohesive attraction exists between the sample contained in petri dish 17 and disc 4 and a portion thereof which is withdrawn from the petri dish in the form of filamentous mass 18. Platform 7 is lowered at constant speed until the filamentous mass 18 is ruptured at which point a second reading is taken on scale 16 (e.g., motor 11 is stopped and a second reading is taken). The difference in milliliters between the initial and second reading taken on scale 16 is indicative of the product's short gel character.

For purposes of this application, an apparatus as described above having the following dimensions and characteristics was constructed:

Calibrated scale 16—Calibrated in millimeters.
Circular platform speed—Suitably geared to provide a constant speed of 25.4 mm./15 seconds.
Disc 4—Transparent, plastic, circular disc having a lower plane surface diameter of 1 inch and a vertical thickness of ½ inch.
Petri dish 17—Circular diameter of 2¾ inches and a vertical thickness of ½ inch.

Using the apparatus so constructed, the following test procedure was used to determine the short gel characteristics as evidenced by short gel reading:

Steps (1) Add 100 grams of 95° C. water to 193 grams of dry mix;

(2) Immediately, mix the added water and dry mix under ambient conditions (i.e., 25° C.) with a standard household mixer operated at 600 r.p.m. for 2 minutes;

(3) Immediately after the above 2 add 60 grams of 5° C. water;

(4) Blend immediately thereafter the resultant product obtained from the above 3 with a standard household mixer for 1 minute at 600 r.p.m. under ambient conditions (i.e., 25° C.);

(5) Immediately thereafter, aerate the blended product from the above 4 for 2 minutes with a standard household mixer operated at 900 r.p.m. under ambient conditions (i.e., 25° C.);

(6) Immediately, place sufficient aerated product in petri dish 17 to completely fill dish 17 and removing any excess therefrom (i.e., above the petri dish rim) with a straightedge; and (7) Fifteen minutes after the commencement of the aforementioned 1 obtain a short gel reading under ambient conditions (i.e., 25° C.) in accordance with the aforementioned disclosure relating to the apparatus and mode of operation thereof.

Unless expressly stated otherwise herein, the short gel readings disclosed herein and in the appendent claims refers to readings obtained from the above test procedure steps 1–7. Stability of the aerated product may be ascertained by obtaining additional short gel readings respectively at 45, 140 and 180 minutes.

Stringy products, in contradistinction to those of short gel characteristics, provide a relatively high reading (e.g., 81 mm.). Short gel readings provided by the instant dry mix composition are less than 35 mm. and most generally range from about 5 mm. to about 30 mm. To provide a stable reconstituted and aerated product, the short gel reading should vary no more than ±10 percent, when readings are respectively taken at 15, 45, 140 and 180 minutes.

Although many of the mixes provided herein do not necessitate the addition of hot water, the aforementioned short gel readings provide a method of physically identifying the present mixes. Thus, employing a somewhat different apparatus or a modified test procedure, slightly different gel readings may be obtained.

Although the density of reconstituted and aerated mixes provided by the instant mixes differ greatly depending upon the ultimate desired product, the density thereof is less than 1.0. Typical reconstituted and aerated products according to the methodology described hereinbefore generally range from about 0.2 to about 0.8.

The following examples are illustrative of the invention.

EXAMPLE I

A lemon flavored filling and topping mix was prepared by dry blending in a ribbon blender the following ingredients:

| Ingredients: | Pounds |
|---|---|
| Lemon flavoring | 0.25 |
| Powdered citric acid | 0.80 |
| Yellow color premix | 2.50 |
| Salt | 0.35 |
| Gelatinized modified tapioca starch [1] | 11.75 |
| Corn syrup solids | 35.0 |
| Sodium carboxymethylcellulose | 0.25 |
| Blend of glyceryl monostearate [2] and propylene glycol monostearate | 0.88 |
| Sugar | 48.22 |
| | 100.00 |

[1] Raw tapioca starch esterified and gelatinized pursuant to FDA Reg. 121.1031(d).
[2] A fused mixture of glyceryl monostearate and propylene glycol monostearate having a weight ratio of glyceryl monostearate to propylene glycol monostearate from about 35–50 of glyceryl monostearate to 50–65 propylene glycol monostearate.

Several 10-ounce aliquots were placed in separate small mixer bowls to which there was added ¼ cup soft butter and ¾ cup hot water (95° C.) and then blended at a low speed with a standard household mixer. One-quarter cup of cold water (5° C.) was added to the blended product and then whipped with a standard household mixer operated at a high speed for 1 minute.

The whipped resultant product having a specific gravity of 0.84 was adaptable for use as a frosting or filling for layer cakes. The product was stable against syneresis even after 7 days of storage under ambient conditions. Mouthfeel, body, meltdown and palatability were of excellent quality without a concomitant pasty, stringy or gummy texture. Short gel reading thereof was about 24 at 15 minutes.

EXAMPLE II

Artifically sweetened lemon flavored frozen dessert mix

The following ingredients were dry blended in a ribbon blender:

| Ingredients: | Pounds |
|---|---|
| Imitation lemon flavoring | 2.5 |
| Citric acid (powdered) | 8.0 |
| Salt | 3.5 |
| Gelatinized modified tapioca starch | 117.5 |
| Sodium carboxymethylcellulose | 2.5 |
| 45:55 weight percent fused blend of glyceryl monostearate and propylene glycol monostearate | 8.0 |
| Dextrin | 250.0 |
| Sodium cyclamate | 5.5 |
| Sodium saccharin | 0.5 |
| Artificial coloring | 25.0 |
| | 423.0 |

To several 59-gram portions of the above mix which had been sifted and dry blended to a homogenous mixture there was added 74 ml. of hot water (95° C.). The resulting hydrated mixes were then blended with a standard household mixer operated at a low speed for 2 minutes. To the hydrated mixes an aditional 74 ml. of cold water (20° C.) was added and the resultant products were whipped with a standard household mixer operated at a high speed for 2 minutes. The resulting dessert product having a specific gravity of 0.48 having short gel properties was then frozen at −20° C. for 4 hours. The frozen product was very similar to ice cream in taste and texture.

EXAMPLE III

A frozen fruit flavored dessert was prepared by employing the ingredients and procedure of Example II with the exception that 100 ml. of hot water (in lieu of the 74 ml. of hot water) was added and the blended product was whipped at a high speed for only 1 minute. Although the degree of aeration was less than the unfrozen product of Example II, the unfrozen product was of a fine, smooth, creamy consistency. The resulting frozen dessert mix had a specific gravity of 0.86 and had a texture and taste similar to a frozen fruit ice or sherbet.

EXAMPLE IV (A) Preparation of spray-dried dextrin-glyceryl monostearate-propylene glycol monostearate premix or dispersion (for use in "cold water" recipe products)

To 485 pounds of water maintained at 165° F., 40 pounds of dextrin was added and agitated until the dextrin was thoroughly dissolved therein. Ten pounds of a 45:55 by weight fused blend of glyceryl monostearate and propylene glycol monostearate was then added to the hot aqueous dextrin solution (165° F.), melted therein and mixed thoroughly for 10 minutes. The resultant product was then spray dried in a commercial spray drying apparatus.

(B) Preparation of a whipped appetizer dip dry mix

A free-flowing dry mix adaptable for use as a whipped appetizer dip base was prepared from the following ingredients by dry blending in a ribbon blender:

| Ingredients: | Pounds |
|---|---|
| Powdered yellow coloring | 6.0 |
| Salt | 0.9 |
| Gelatinized tapioca starch | 28.4 |
| Sodium carboxymethylcellulose | 0.6 |
| Spray-dried dextrin-glyceryl monostearate-propylene glycol monostearate | 20.0 |
| Dextrin | 14.0 |
| Corn syrup solids | 30.1 |
| | 100.0 |

To several 59-gram aliquots of the aboce mix there was added 150 ml. of tap water (100° F.) and the resultant product was whipped via a standard household mixer operated at a high speed for 3 minutes. The resultant whipped product was of a light, creamy consistency and had a specific gravity of about 0.43. Upon standing, it was also observed that the specific gravity remained substantially the same. An appetizer dip suitable for use as a potato chip dip was then prepared by folding into the whipped product using a standard household mixer operated at a low speed for 20 seconds, 1¼ ounces of a dehydrated onion soup mix.

EXAMPLE V (A) Cold water premixes and products

Employing the methodology of Example IV(A), 3 distinct cold water premixes were prepared by respectively dissolving in 485 pounds of water at 165° F., the following ingredients:

(a) Sugar and gum arabic premix.—Sugar, 20 pounds; gum arabic, 20 pounds.

(b) Gum arabic premix.—Gum arabic, 40 pounds.

(c) Arabinogalactan premix. — Arabinogalactan, 40 pounds.

As in Example IV, 10 pounds of a 45:55 weight percent fused blend of glyceryl monostearate to propylene glycol monostearate was added to the above hot aqueous hydrocolloid containing solutions (165° F.), allowed to melt therein, thoroughly mixed therein for 10 minutes and then spray dried.

(B) Sugar-gum arabic premix—cold water soluble toppings

A whipped topping mix prepared from a blend of the following mix ingredients:

| Ingredients: | Ounces |
|---|---|
| Spray-dried, sugar-gum arabic premix (Example V(A)) | 28.5 |

| | |
|---|---|
| Blend of glyceryl monostearate [1] and propylene glycol monostearate | 5.7 |
| Sugar | 11.4 |
| Gum arabic | 11.4 |
| | 28.5 |

| | |
|---|---|
| Sugar | 37.90 |
| Agar-sugar (spray dried 1:10) | 14.30 |
| Gelatinized starch | 18.20 |
| Salt | 0.50 |
| CMC | .35 |
| Flavor and color additives | .25 |
| | 100.00 |

[1] A fused mixture of glyceryl monostearate and propylene glycol monostearate having a weight ratio of glyceryl monostearate to propylene glycol monostearate from about 35–50 of glyceryl monostearate to 50–65 propylene glycol monostearate.

In 2 separate 56.4 gram aliquots of the above blend there was respectively added 4 ounces of cold water (5° C.) and cold milk (5° C.). The respective reconstituted mixes were blended for 1 minute with a standard household mixer at a low speed and whipped at a high speed (i.e., 900 r.p.m.). The resultant whipped product reconstituted with milk has a density of 0.49. The density for the water reconstituted and whipped topping was 0.27. The short gel readings for the resultant reconstituted mixes at 25° C. and 15 minutes were 15.8 for the cold water product and 17.2 for the cold milk product. The short gel reading of the mix after standing 15 minutes at 25° C. when 193 grams of the mix is reconstituted with 100 grams of 95° C. water, mixed with a standard household mixer at 600 r.p.m. for 2 minutes followed by the addition of 60 grams of 5° C. water and subsequent whipping thereof at 90 r.p.m. for 2 minutes was 13.2.

(C) Partially aerated and fully aerated gelatin products

The following mix ingredients were employed in preparing whipped toppings:

| Ingredients: | Ounces |
|---|---|
| Premix (Example V(A)(b)) | 14.7 |
| Gum arabic | 11.8 |
| Blend of glyceryl monostearate¹ and propylene glycol monostearate | 2.9 |
| | 14.7 |
| Sugar | 65.7 |
| Gelatinized starch | 11.6 |
| Gelatin | 5.2 |
| Citric acid | 1.7 |
| Sodium citrate | .8 |
| Flavoring and coloring additives | .3 |
| | 100.0 |

¹ A fused mixture of glyceryl monostearate and propylene glycol monostearate having a weight ratio of glyceryl monostearate to propylene glycol monostearate from about 35–50 of glyceryl monostearate to 50–65 propylene glycol monostearate.

A fully aerated whipped topping product was prepared in the following manner:

(1) Add ½ cup of 95° C. water to 3 ounces of the above mix;
(2) Blend in a standard household mixer at a slow speed for 45 seconds to dissolve the mix ingredients;
(3) Add ¾ cup of milk (5° C.) thereto; and,
(4) Whip at 900 r.p.m. in a standard household mixer for 3½ minutes.

The resultant whipped topping had a density of 0.60 and a short gel character. Employing water in lieu of milk provides a whipped product having a density of about 0.45.

A two-phase fruit flavored gelled dessert consisting of a cold set unwhipped portion (about 50 percent) and a fully aerated top phase was prepared in the following manner:

(1) Add ¾ cup of 95° C. water to 3 ounces of the above mix;
(2) Blend for 1 minute at 350 r.p.m. with a standard household mixer;
(3) Add ½ cup of cold water (5° C.) and partially aerate with a standard household mixer operated at 600 r.p.m. for 2 minutes; and,
(4) Refrigerate for 3 hours.

The whipped product consisted of an upper layer of whipped topping with a nonaerated cold set lower layer. Density of the upper layer was about the same as the fully aerated gelatin product. Both layers possessed a short gel character.

(D) Cold water soluble arabinogalactan whipped topping

Employing the ingredients and recipe of the above IV(B) excepting the substitution therein of 28.5 ounces of the arabinogalactan, propylene glycol monostearate, glyceryl monostearate premix, whipped toppings of similar short gel character and density were prepared. A frozen sample thereof (e.g., −20° C.) similar to a smooth sherbet, ice cream or mousse.

EXAMPLE VI

Short gel readings for various gelatinized starch mixes in the amounts listed in Tables I, II, III and IV were obtained In Runs 1–11 and 13–21, all of the above-listed ingredients (excluding the water) were dry blended in a ribbon blender Unless expressly stated otherwise, regular granulated sugar (sucrose) was employed. The gel readings for the above runs were obtained in the following manner:

(a) Hot water (i.e., greater than 95° C.) in the designated amounts was added to the blended dry mix (immediately followed);
(b) By mixing for 2 minutes with a standard household mixer operated at 600 r.p.m.;
(c) The cold water (in amounts designated) was then added;
(d) The resultant product was further blended with a standard household mixer for 1 minute at 600 r.p.m. and mixed an additional 2 minutes at 900 r.p.m. for 2 minutes; and,
(e) Short gel reading at 25° C. were respectively taken at 15, 45, 140 and 180 minutes after the addition of water to the dry mix

TABLE I

| Run No. | Ingredients (Parts by Weight) | | | | | | | | | Short Gel Charactertistics (time in minutes) | | | |
|---|---|---|---|---|---|---|---|---|---|---|---|---|---|
| | Starch | Water | GMS¹ | PGMS² | Sugar | Citric Acid | Corn Syrup | Salt | CMC | (15) | (45) | (140) | (180) |
| 1 | 11.75 | ³92.5+⁴92.5 | | | | | | | | 8.0 | 10.0 | 12.5 | 12.1 |
| 2 | 11.75 | ³92.5+⁴92.5 | ⁵0.35 | ⁵0.53 | | | | | | 14.4 | 15.6 | 14.8 | 15.0 |
| 3 | 11.75 | ⁶92.5+⁴92.5 | 0.35 | ⁵0.53 | | | | | | 14.1 | 15.6 | 15.0 | 14.5 |
| 4 | 11.75 | ³92.5+⁴94.5 | 0.88 | | | | | | | 14.7 | 10.7 | 7.3 | 6.9 |
| 5 | 11.75 | ³92.5+⁴94.5 | | 0.88 | | | | | | 12.6 | 13.9 | 13.6 | 12.9 |

¹ Glyceryl monostearate.
² Propylene glycol monostearate.
³ At 75° C.
⁴ At 5° C.
⁵ Fused mixture of 40 percent by weight GMS and 55 percent by weight PGMS.
⁶ Boiling water was added.

TABLE II

| Run No. | Ingredients (Parts By Weight) | | | | | | | | Short Gel Characteristics (time in minutes) | | | |
|---|---|---|---|---|---|---|---|---|---|---|---|---|
| | Starch | Water | GMS [1] | PGMS [2] | Sugar | Citric Acid | Corn Syrup | Salt | CMC | (15) | (45) | (140) | (180) |
| 6 | 11.75 | [3] 92.5 +[4] 94.5 | 0.35 | 0.53 | | | | | | 14.8 | 14.3 | 14.3 | 14.3 |
| 7 | 11.75 | [3] 92.5 +[4] 94.5 | [5] 0.35 | [5] 0.53 | 86 | | | | | 14.9 | 14.7 | 15.5 | 15.9 |
| 8 | 11.75 | [3] 92.5 +[4] 94.5 | [5] 0.35 | [5] 0.53 | 86 | 0.82 | | | | 16.0 | 15.6 | 16.2 | 15.2 |
| 9 | 11.75 | [3] 92.5 +[4] 94.5 | [4] 0.35 | [4] 0.53 | 86 | 0.82 | | | 0.25 | 16.5 | 15.9 | 15.5 | 16.2 |
| 10 | 11.75 | [3] 92.5 +[4] 94.5 | [5] 0.35 | [5] 0.53 | 52.8 | 0.82 | 33.2 | | 0.25 | 15.0 | 16.1 | 15.6 | 15.8 |
| 11 | 11.75 | [3] 51.7 +[4] 34.5 | [5] 0.35 | [5] 0.53 | 52.8 | 0.82 | 33.2 | | 0.25 | 19.6 | 21.4 | 21.0 | 21.8 |

For footnotes 1 through 5, inclusive, see Table I.

TABLE III

| Run No. | Ingredients (Parts by Weight) | | | | | | | | Short Gel Characteristics (time in minutes) | | | |
|---|---|---|---|---|---|---|---|---|---|---|---|---|
| | Starch | Water | GMS [1] | PGMS [2] | Sugar | Citric Acid | Corn Syrup | Salt | CMC | (15) | (45) | (140) | (180) |
| 12 | 11.75 | [3] 51.7+[4] 34.5 | [5] 0.35 | [5] 0.53 | 18.8+[7] 34.0 | 0.82 | 33.2 | | 0.25 | 21.2 | 22.4 | 21.5 | 22.2 |
| 13 | 11.75 | [3] 51.7+[4] 34.5 | [5] 0.35 | [5] 0.53 | [8] 52.8 | 0.82 | 33.2 | | 0.25 | 22.4 | 23.8 | 23.3 | 23.7 |
| 14 | [6] 11.75 | [3] 51.7+[4] 34.5 | [5] 0.35 | [5] 0.53 | [8] 52.8 | 0.82 | 33.2 | | 0.25 | 23.3 | 25.9 | 25.6 | 25.9 |
| 15 | 11.75 | [3] 51.7+[4] 34.5 | [5] 0.35 | [5] 0.53 | [8] 52.8 | 0.82 | 33.2 | 0.35 | 0.25 | 22.0 | 24.2 | 24.1 | 23.5 |
| 16 | 11.75 | [3] 51.7+[4] 34.5 | | | [8] 52.8 | 0.82 | 33.2 | 0.35 | 0.25 | 53.7 | 81.0 | 81.8 | 81.0 |

For footnotes 1 through 6, inclusive, see Table I.
[7] Sugar added after blending but before aeration.
[8] Granulated sucrose.

TABLE IV

| Run No. | Ingredients (Parts by Weight) | | | | | | | | Short Gel Characteristics (time in minutes) | | | |
|---|---|---|---|---|---|---|---|---|---|---|---|---|
| | Starch | Water | GMS [1] | PGMS [2] | Sugar | Citric Acid | Corn Syrup | Salt | CMC | (15) | (45) | (140) | (180) |
| 17 | 11.75 | [3] 51.7+[4] 34.5 | 0.40 | 0.48 | [5] 52.8 | 0.82 | 33.2 | 0.35 | 0.25 | 26.8 | 29.0 | 30.0 | 26.9 |
| 18 | 11.75 | [3] 51.7+[4] 34.5 | 0.18 | 0.70 | [5] 52.8 | 0.82 | 33.2 | 0.35 | 0.25 | 27.9 | 29.1 | 28.6 | 27.4 |
| 19 | 11.75 | [3] 51.7+[4] 34.5 | 0.70 | 0.18 | [5] 52.8 | 0.82 | 33.2 | 0.35 | 0.25 | 24.9 | 26.0 | 25.9 | 27.0 |
| 20 | 11.75 | [3] 51.7+34.5 | | 0.88 | [5] 52.8 | 0.82 | 33.2 | 0.35 | 0.25 | 28.1 | 29.9 | 28.9 | 29.2 |
| 21 | 11.75 | [3] 51.7+[4] 34.5 | 0.88 | | [5] 52.8 | 0.82 | 33.2 | 0.35 | 0.25 | 30.3 | 31 | 27.4 | 23.7 |

For footnotes 1 through 4, inclusive, see Table I.
[5] Granulated sucrose.

Run 12 results were similarly obtained with the exception that 18.8 grams of the sugar were dry blended and 34.0 grams of sugar were added after the blending of the reconstituted mix. Both Runs 1 and 16 were conducted without the presence of either the glyceryl fatty acid monoester or propylene glycol fatty acid monoester. Although Run 1 provided a product of a relatively low short gel reading, thus indicating the lack of stringiness thereof, the product failed to aerate. Run 16 which in addition to the gelatinized starch contained sugar provided an extremely stringy product. Run 4 provided an aerated product with a short gel character, however, the product was unstable as evidenced by the change in the short gel reading (i.e., 14.7 to 6.9). Run 5 provided a product of short gel character, however, it could not be aerated. Although the product obtained from Run 20 provided a short gel reading, the product could not be aerated. Similar results to that of Run 4 were observed for the hydrated aerated product in Run 21 which in addition to the gelatinized starch and glyceryl monostearate contained sugar, citric acid, corn syrup, salt and carboxymethylcellulose (reading at 15 minutes, 30.0; reading at 180 minutes, 23.7). The rehydrated and whipped products obtained from Runs 2, 3, 6–15 and 17–19 which contained both the glyceryl fatty acid monoester and propylene glycol fatty acid monoester provided a product which was susceptible to aeration as well as having short gel characters. Thus, it may be observed from the above tables that the combination of the gelatinized starch, glyceryl fatty acid monoesters and propylene glycol fatty monoesters is necessary to provide an aerated product with a short gel character.

EXAMPLE VII (A) Preparation of a fruit flavored sherbet-type dry mix

Ingredients: Pounds
- Imitation raspberry flavoring ____ 0.24
- Powdered citric acid ____ .80
- Salt ____ .35
- Gelatinized tapioca starch ____ 11.75
- Sodium carboxymethylcellulose ____ .25
- Dextrin-glyceryl monostearate-propylene glycol monostearate [1] ____ 25.8
- Artificial coloring ____ 2.5
- Artificial sweetener blend ____ 6.0

- Sodium cyclamate ____ 5.5
  - Sodium saccharin ____ 0.5

6.0

[1] Prepared according to Example IV(A).

(B) Preparation of the fruit flavored "freeze-type" frozen dessert mix

To 59-gram portions of the above free-flowing fruit flavored "freeze" dry mix there was added 150 ml. of water (100° F.) and it was then mixed with a standard household mixer operated at a high speed for 3 minutes. The resulting product had a specific gravity of 0.26 and of a smooth, aerated, creamy texture. Upon standing under ambient conditions for 30 hours, no concomitant formations of a hard, tough skin or syneresis was observed. Density of the product upon standing remained substantially the same. The product was similar in light whipped character and smooth eating quality to a flavored whipped cream.

What is claimed is:

1. An edible dry mix composition containing less than 8 percent by weight fat and proteinaceous material and which is adapted upon hydration and mixing to provide an aerated food product of a fine, smooth, creamy consistency, said mix composition comprising a gelatinized starch and a surfactant composition, said surfactant composition being present in the mix composition in an amount ranging from at least 2.0 to about 50 weight percent of the gelatinized starch dryweight, said surfactant composition comprising at least 1 glyceryl fatty acid monoester and at least 1 propylene glycol fatty acid monoester, said mix containing a weight ratio of the glyceryl monoester to the propylene glycol monoester ranging from about 1:10 to about 10:1, said mix being further characterized by providing a short gel reading at 24° C. at 15 minutes of less than 35.

2. The mix according to claim 1 wherein the amount of gelatinized starch contained therein is at least 5 weight percent of the total mix weight.

3. The mix according to claim 2 wherein the amount of glyceryl fatty acid monoester and propylene glycol fatty acid monoester contained therein ranges from about 3 to about 25 weight percent gelatinized starch dry weight.

4. The mix according to claim 3 wherein the amount of gelatinized starch based upon the total dry mix weight ranges from about 10 to about 40 weight percent.

5. The mix according to claim 4 wherein at least a major portion of the propylene glycol fatty acid monoester and glyceryl fatty acid monoesters consist of the fatty acid monoesters having from 16 to 18 carbon atoms inclusive.

6. The mix according to claim 5 which contains a sweetening agent.

7. The mix according to claim 6 wherein the surfactant composition consists essentially of the propylene glycol fatty acid monoester and glyceryl fatty acid monoester, said surfactant composition ranging from about 5 to about 15 weight percent of the dry gelatinized starch weight.

8. The mix according to claim 7 wherein the weight ratio of glyceryl fatty acid monoester to propylene glycol fatty acid monoester ranges from about 40 to about 60.

9. The mix according to claim 8 wherein the mix contains sugar in an amount ranging from about 5 to about 90 weight percent of the total dry mix weight.

10. The mix according to claim 9 wherein the glyceryl fatty acid monoester is glyceryl monostearate and the propylene glycol fatty acid monoester is propylene glycol monostearate.

11. The mix according to claim 10 wherein the amount of fat and proteinaceous material contained therein based upon the total dry weight thereof is less than 5 weight percent.

12. The mix according to claim 11 wherein the short gel reading thereof ranges from about 10 to about 30.

13. An edible dry mix composition containing less than 5 weight percent by total weight of proteinaceous material and fat and adapted to provide a short gel reading at 25° C. and 15 minutes from about 10 to about 30, said mix consisting essentially of about 40 parts by weight gelatinized starch, about 3 to about 20 parts by weight surfactant composition, a sweetening agent in an amount up to about 500 parts by weight and a water-soluble hydrophilic film former in an amount ranging from about 0 to about 100 parts by weight, said surfactant composition comprising a major portion of at least 1 glyceryl fatty acid monoester and at least 1 propylene glycol fatty acid monoester, the ratio of said glyceryl fatty acid monoester to propylene glycol fatty acid monoester ranging from about 1:10 to about 10:1.

14. A cold water soluble mix according to claim 13 wherein the surfactant composition is provided in the mix as a surfactant composition particulate having a solubility of at least 1 part by weight per 5 parts by weight water at 20° C., said particulate comprising an edible hydrophilic film surfactant composition.

15. A cold water soluble mix according to claim 14 wherein the surfactant composition is provided in the mix as a powdered composition exhibiting a solubility in 20° C. water of at least 1 part powdered composition per 5 parts of water, said powdered composition comprising a matrix of an edible hydrophilic film former with uniform distribution through said matrix of the surfactant composition.

16. The cold water soluble mix according to claim 15 wherein the surfactant composition consists essentially of at least 1 glyceryl fatty acid monoester and at least 1 propylene glycol fatty acid monoester, the weight ratio of said glyceryl fatty acid monoester and propylene glycol fatty acid monoester ranging from about 3:7 to about 7:3.

17. The cold water soluble mix according to claim 16 wherein the surfactant composition consists essentially of propylene glycol monostearate and glyceryl monostearate and the gelatinized starch is gelatinized tapioca starch.

18. The cold water soluble mix according to claim 17 wherein the hydrophilic film former is gum arabic.

19. The cold water soluble mix according to claim 18 wherein the powdered composition is spray-dried surfactant composition, gum arabic and sugar.

20. The cold water soluble mix according to claim 19 wherein the powdered composition is spray-dried arabinogalactan.

21. A method of providing an aerated dessert product containing on a dry weight basis less than 8 weight percent proteinaceous materials and triglyceride fat which comprises admixing an edible aqueous medium, gelatinized starch, a sweetening agent and from about 0.5 to about 25 weight percent of a surfactant composition consisting essentially of a glyceryl fatty acid monoester wherein the fatty acid monoester contains from 12 to 22 carbon atoms inclusive and a propylene glycol fatty acid monoester wherein the fatty acid monoester contains from 12 to 22 carbon atoms inclusive; the weight ratio of said glyceryl fatty acid monoester to propylene glycol fatty acid monoester ranges from about 1:10 to about 10:1, continuing the mixing of said aqueous medium containing said gelatinized starch, surfactant composition and sweetening agent under conditions sufficient to provide aeration thereof for a period of time to provide a short gel reading of less than 35.

22. The method according to claim 21 wherein the amount of gelatinized starch which is admixed to said aqueous medium ranges from about 3 to about 35 weight percent of the total dry weight thereof.

23. The method according to claim 22 wherein the amount of sugar contained in said aqueous medium based upon the dry weight thereof ranges from about 5 to about 90 weight percent.

References Cited

UNITED STATES PATENTS

| | | | |
|---|---|---|---|
| 2,913,342 | 11/1959 | Cameron et al | 99—139 |
| 3,295,986 | 1/1967 | Saslaw et al. | 99—139 XR |
| 3,330,667 | 7/1967 | Tressler | 99—139 |
| 3,343,967 | 9/1967 | Rubenstein | 99—139 XR |

RAYMOND N. JONES, *Primary Examiner.*

J. M. HUNTER, *Assistant Examiner.*

U.S. Cl. X.R.

99—136